(12) United States Patent
Scott et al.

(10) Patent No.: US 7,204,282 B2
(45) Date of Patent: Apr. 17, 2007

(54) SYSTEM FOR MODULAR TIRE CHAIN STRUCTURE

(75) Inventors: Gary Scott, Milwaukie, OR (US); Robert Anderson, Portland, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 81 days.

(21) Appl. No.: 10/703,841

(22) Filed: Nov. 4, 2003

(65) Prior Publication Data

US 2005/0092410 A1 May 5, 2005

(51) Int. Cl.
*B60C 27/00* (2006.01)
(52) U.S. Cl. .................. 152/242; 152/219; 152/231; 152/241
(58) Field of Classification Search ............ 152/171, 152/217, 219, 223, 231, 239, 241, 242, 232, 152/233, 243
See application file for complete search history.

(56) References Cited

U.S. PATENT DOCUMENTS

| | | | | | |
|---|---|---|---|---|---|
| 2,770,281 | A | * | 11/1956 | Eddy | 152/241 |
| 2,788,049 | A | * | 4/1957 | Canepa | 152/239 |
| 3,228,446 | A | * | 1/1966 | Meys | 152/241 |
| 3,496,982 | A | * | 2/1970 | St Pierre | 152/241 |
| 3,766,957 | A | * | 10/1973 | Witzel | 152/242 |
| 3,895,419 | A | * | 7/1975 | Roberts | 24/598.1 |
| 3,913,651 | A | * | 10/1975 | Stonack | 152/213 R |
| 4,146,076 | A | * | 3/1979 | Matsui | 152/221 |
| 4,182,392 | A | * | 1/1980 | Muller | 152/219 |
| 4,216,811 | A | * | 8/1980 | Gray | 152/213 A |
| 4,416,318 | A | * | 11/1983 | Rieger et al. | 152/213 A |
| 4,431,042 | A | * | 2/1984 | Daniel | 152/243 |
| 4,542,779 | A | * | 9/1985 | Muller et al. | 152/213 A |
| 4,615,368 | A | * | 10/1986 | Nestlen | 152/213 A |
| 4,749,015 | A | * | 6/1988 | Miyagawa | 152/213 A |
| 4,958,415 | A | * | 9/1990 | Johnson | 24/69 TT |
| 5,009,256 | A | * | 4/1991 | Smith | 152/221 |
| 5,056,206 | A | * | 10/1991 | Poulsen | 29/428 |
| 5,167,737 | A | * | 12/1992 | Sakuma | 152/219 |
| 5,236,025 | A | * | 8/1993 | Maresh | 152/219 |
| 6,345,653 | B1 | * | 2/2002 | Fu | 152/219 |
| 6,591,882 | B1 | * | 7/2003 | Clark et al. | 152/213 R |

FOREIGN PATENT DOCUMENTS

| | | | |
|---|---|---|---|
| FR | 2630682 | * | 4/1988 |
| FR | 2630972 | * | 5/1988 |
| JP | 1-164609 | * | 6/1989 |
| JP | 1-257609 | * | 10/1989 |
| JP | 3-99909 | * | 4/1991 |
| JP | 3-193511 | * | 8/1991 |

* cited by examiner

*Primary Examiner*—Russell D. Stormer
(74) *Attorney, Agent, or Firm*—Schwabe, Williamson & Wyatt, P.C.

(57) ABSTRACT

A flexible system for winter traction products that allows for component repairability, interchangeability, customization and resizing, all without requiring tools. The key to this system is the provision of connectors which provide interconnection of multiple components whereby at least three points of connection on three components can be interconnected by the connectors. The interconnection of the points of connection by the connectors enable components to be interchanged within the assembly for establishing a desired style and fit of the tire chain to a variety of tire sizes and tire chain types.

4 Claims, 10 Drawing Sheets

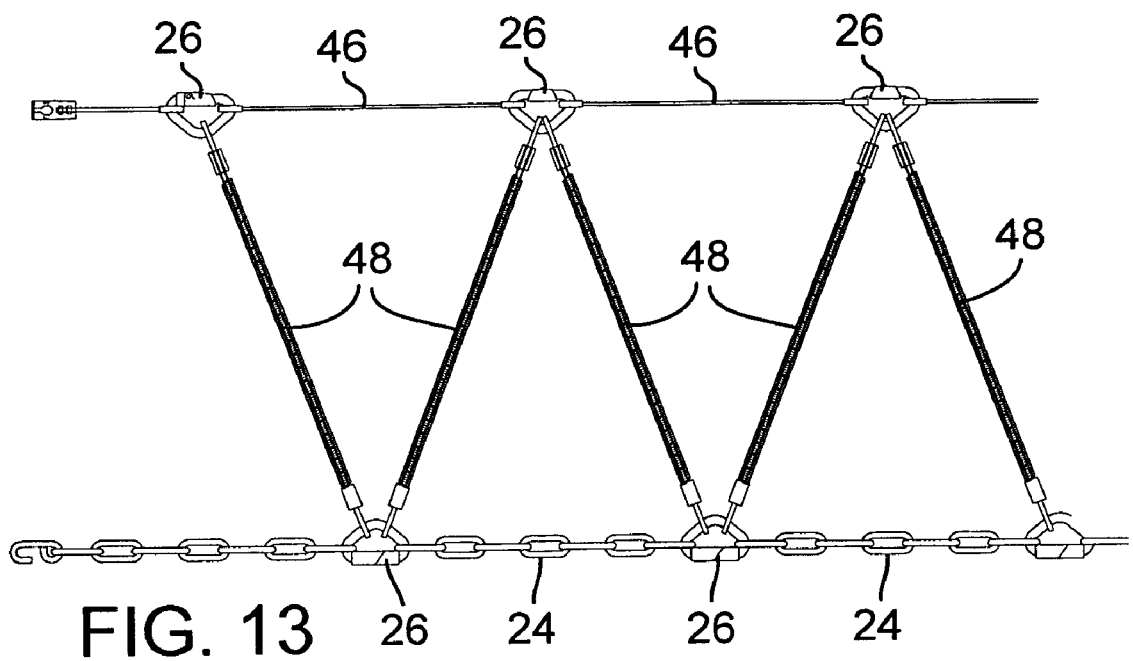
FIG. 13
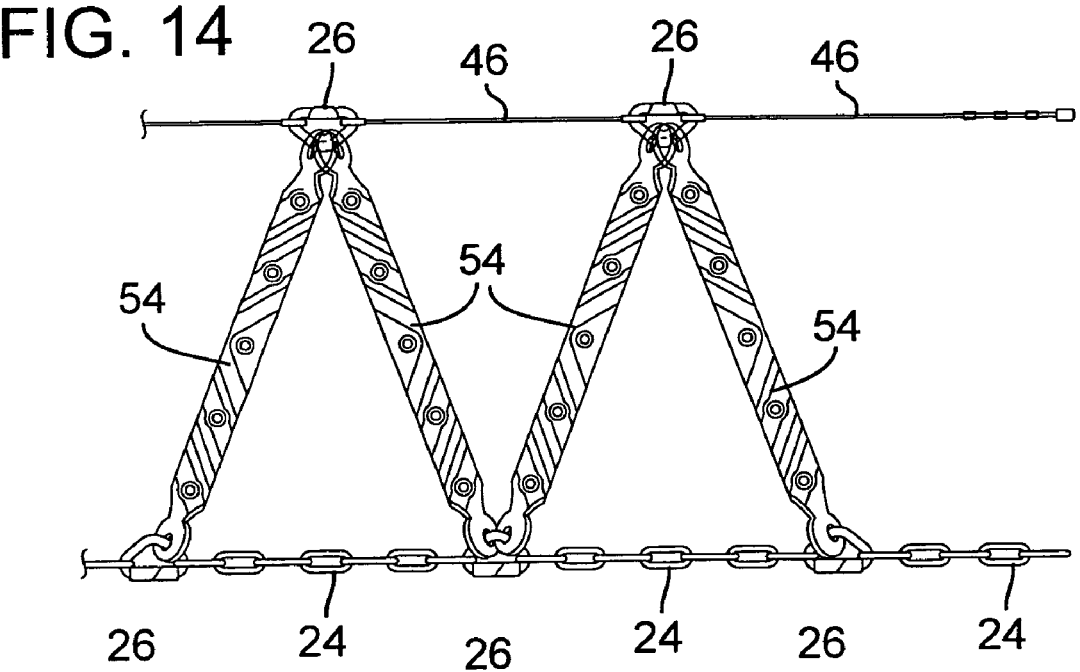
FIG. 14
FIG. 15
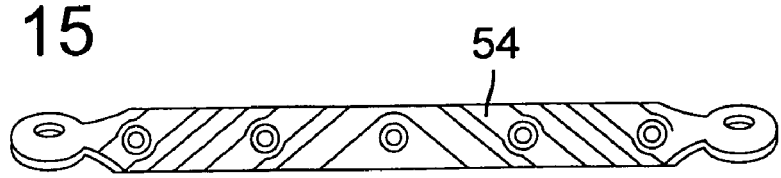

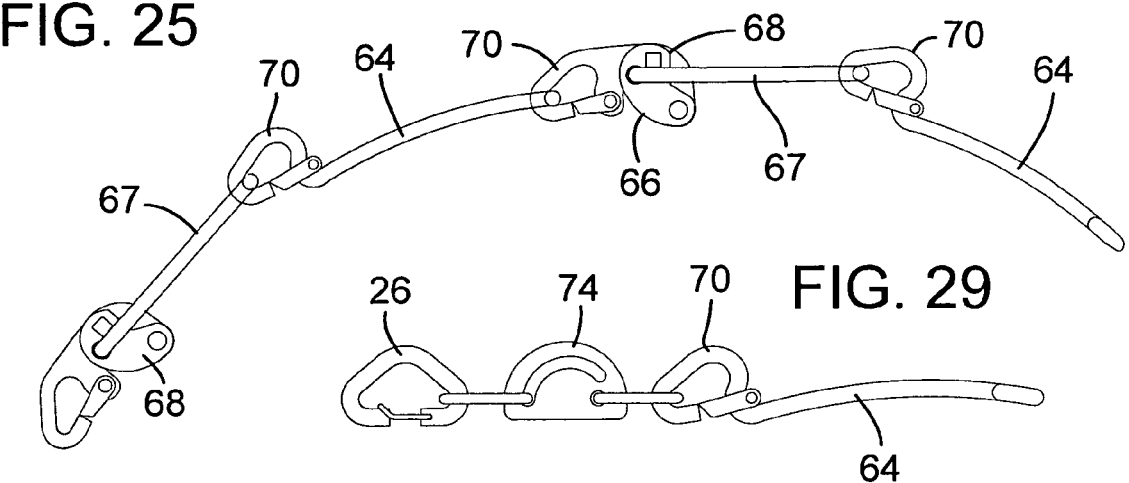
FIG. 25
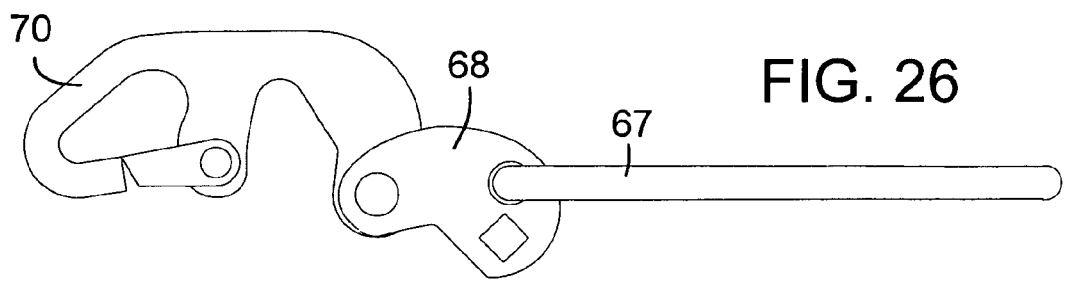
FIG. 29
FIG. 26
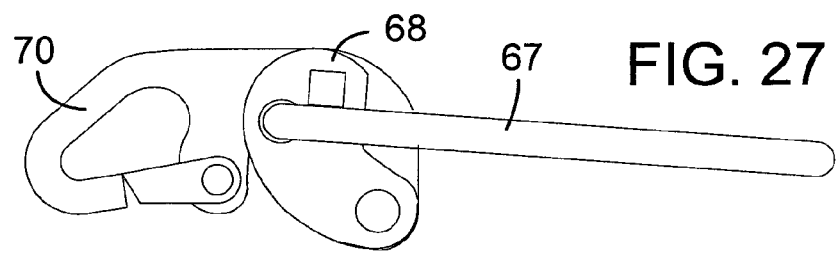
FIG. 27
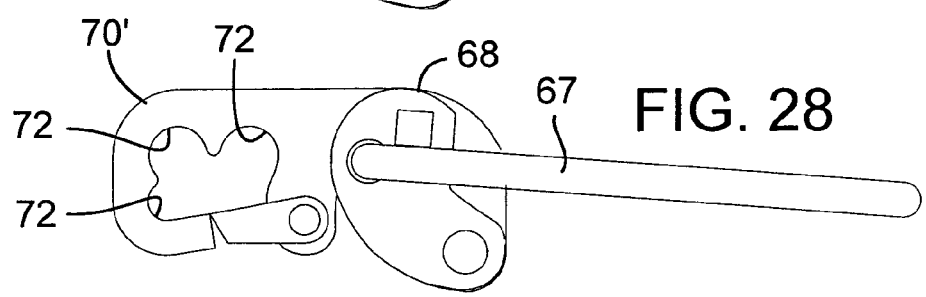
FIG. 28
FIG. 30
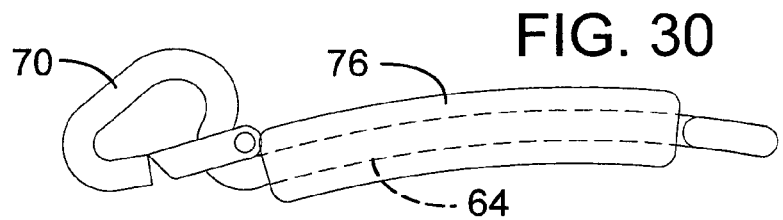

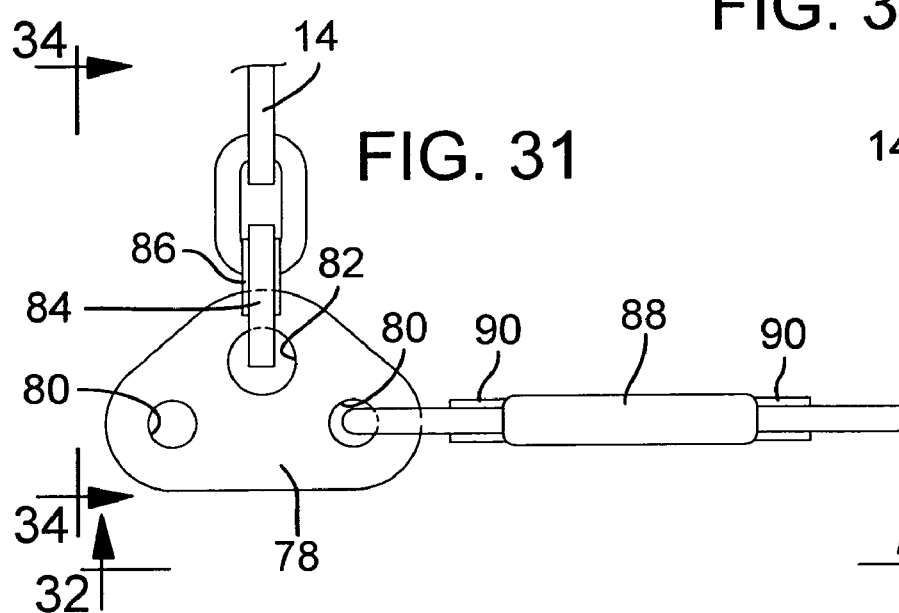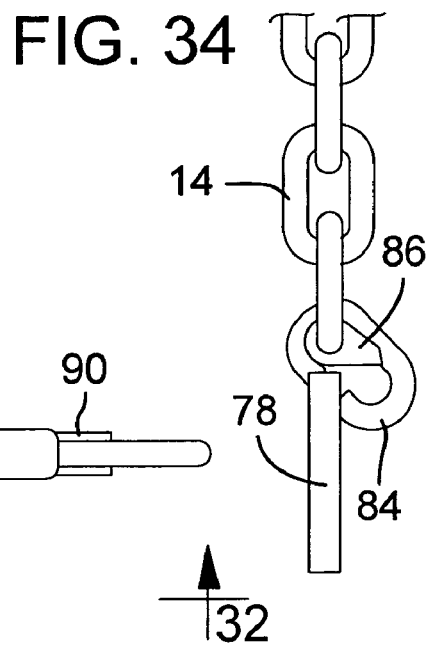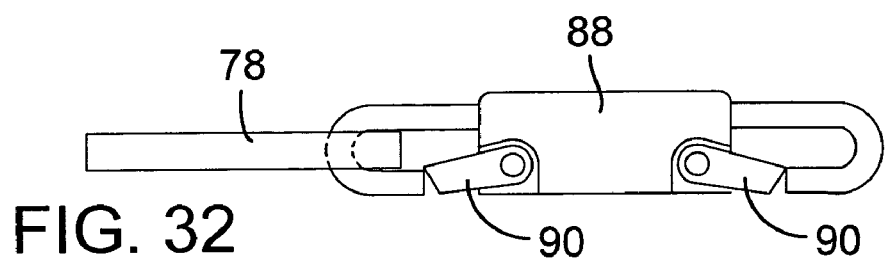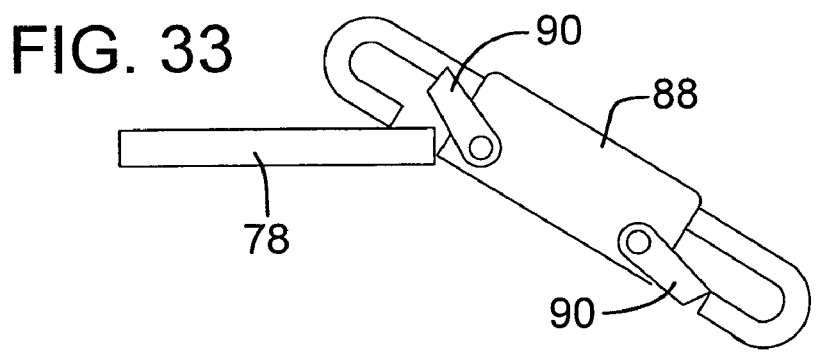

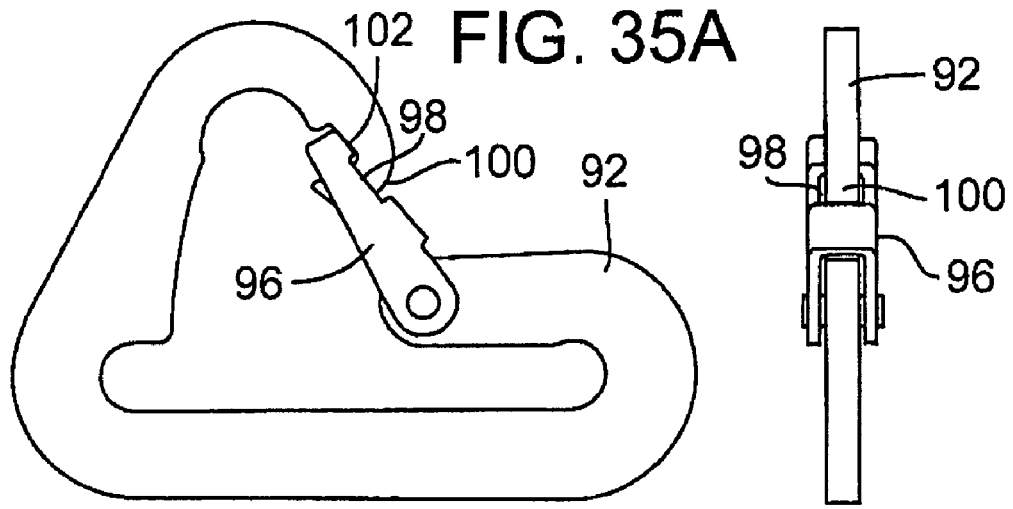
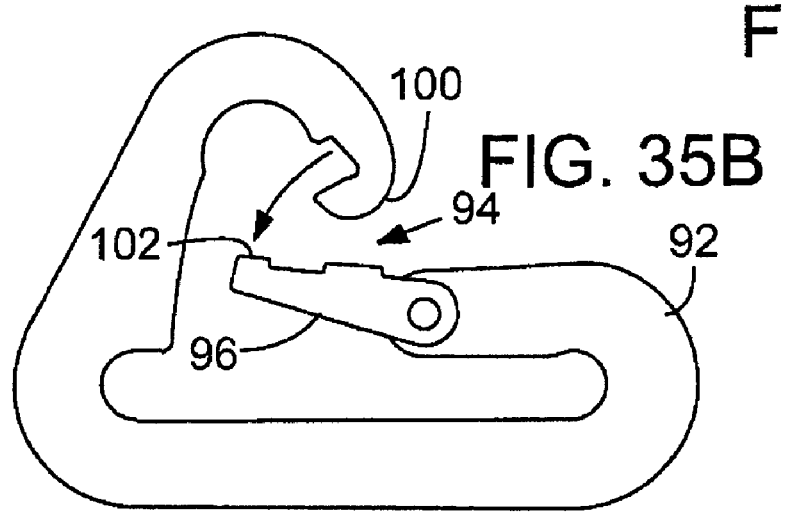
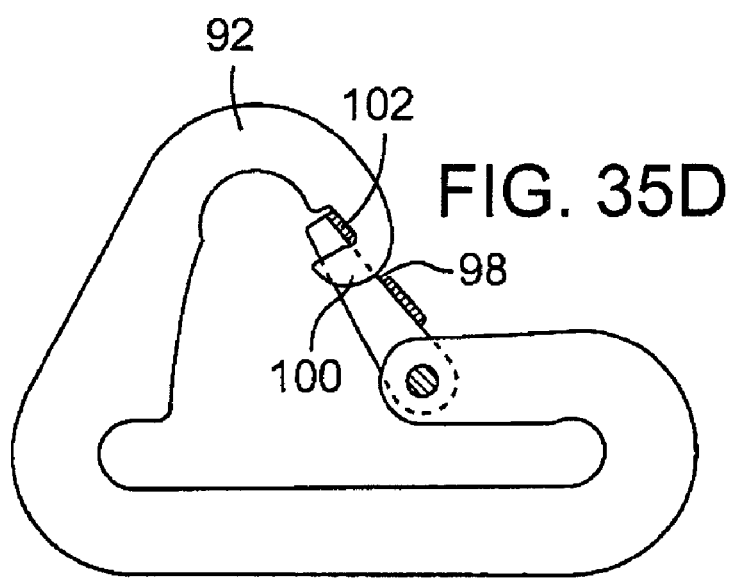

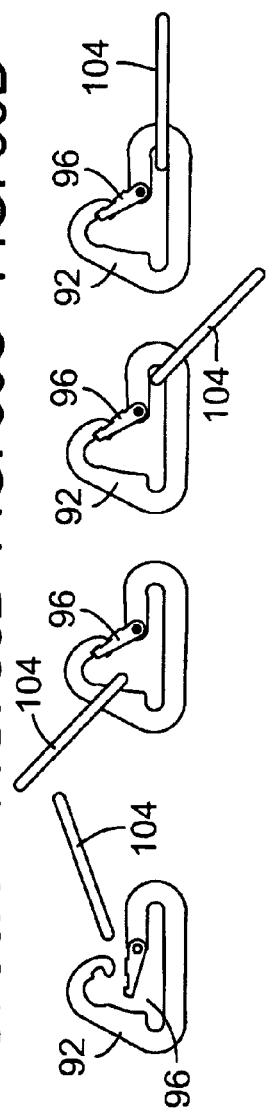
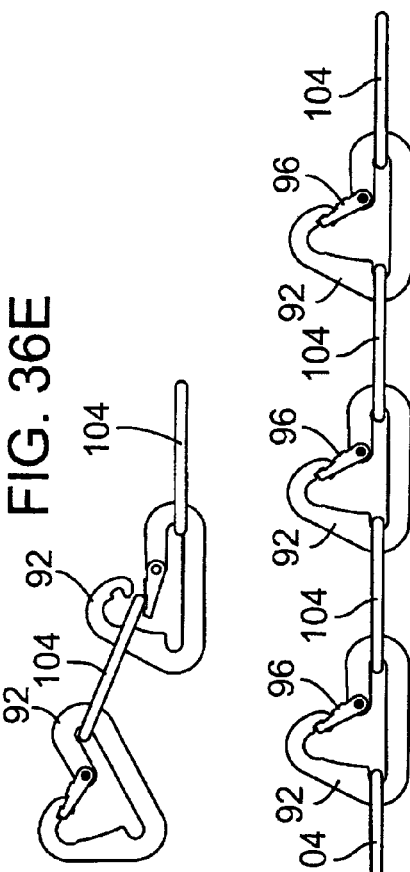
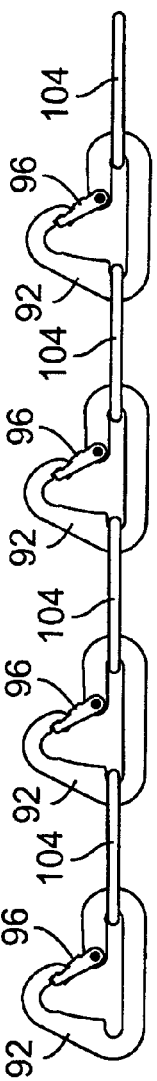
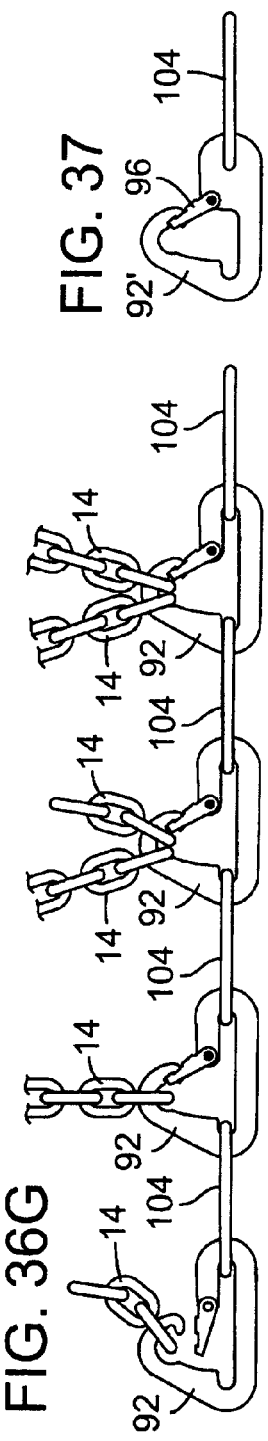
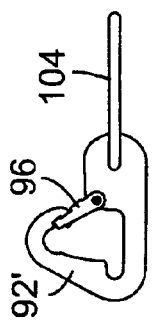

SYSTEM FOR MODULAR TIRE CHAIN STRUCTURE

FIELD OF THE INVENTION

This invention relates to a tire chain structure, including side members, and cross members and releasable connectors connecting the side members and cross members.

BACKGROUND OF INVENTION

The concept of releasable fasteners for tire chains is disclosed in commonly owned U.S. Pat. No. 6,591,882, the disclosure of which is incorporated herein by reference. The concept of the releasable fastener used in that patent was to enable the removal and replacement of a cross member that had become worn or damaged. Thus, when a tire chain broke, it was almost invariably a broken cross member. By securing the cross members to the side members using releasable connectors or fasteners, an operator merely has to actuate the release mechanism, remove the broken cross member, and replace that cross member with a spare cross member.

The above basic concept has been expanded to establish a new and different dimension of tire chain structure.

SUMMARY OF INVENTION

The present invention is directed to the concept of modular construction. Connectors are preferably (but not necessarily) independent of the cross members and the side members. Further, at least certain of the connectors are designed to interconnect three component ends. For example, a side member for a tire chain may be constructed from short segments of interconnected chain links. The length of each segment determines the spacing between cross members. Thus, a connector connects one segment to another and both segments to a chain link cross member. The free end of one of the segments is connected to a third segment and a second cross member, and so on until the desired length for a complete side member is achieved. The opposite side member is similarly constructed. As desired, the segments may be replaced with cam locks or other tightening devices and alternate side member types may be used such as cable sections, bars, etc. The side member ends (the free ends when all of the segments are interconnected) can be fitted with a standard quick release, length-adjustable fastener or even a further connector as used for connecting the segments.

The above concept is considered a flexible modular construction or system for winter traction products that allows for component repairability, interchangeability, customization and resizing, all without requiring tools. Thus, a supplier or dealer can stock a variety of components of different sizes and types and with the different components provided with points of connection adapted to receive the above connectors. A customer needing tire chains for whatever size of tire can be quickly accommodated with the required tire chain size through the assembly of selected components that will make up that size. A user (truck driver, for instance) can repair worn and broken cross members without tools. The connectors can also be adapted to different styles of tire chains, e.g., as between cable or part cable and chain or part chain; configured as a Z-type, V-type, H-type or ladder type, etc. The invention will be more fully understood and appreciated upon reference to the following detailed description and accompanying drawings.

BRIEF DESCRIPTION OF DRAWINGS

FIG. 13 is a variation of the tire chain of FIG. 11;

FIGS. 14 and 15 illustrate a further combination of component types making up a tire chain in accordance with the invention;

FIGS. 24–30 illustrate still further embodiments of the invention;

FIGS. 31–34 illustrate a still further embodiment of the invention;

FIGS. 35A through 35D and FIGS. 36A through 36G illustrate a further embodiment of the invention; and FIG. 37 illustrates a variation of the connector of FIGS. 35 through 36.

DETAILED DESCRIPTION

Figure 1:
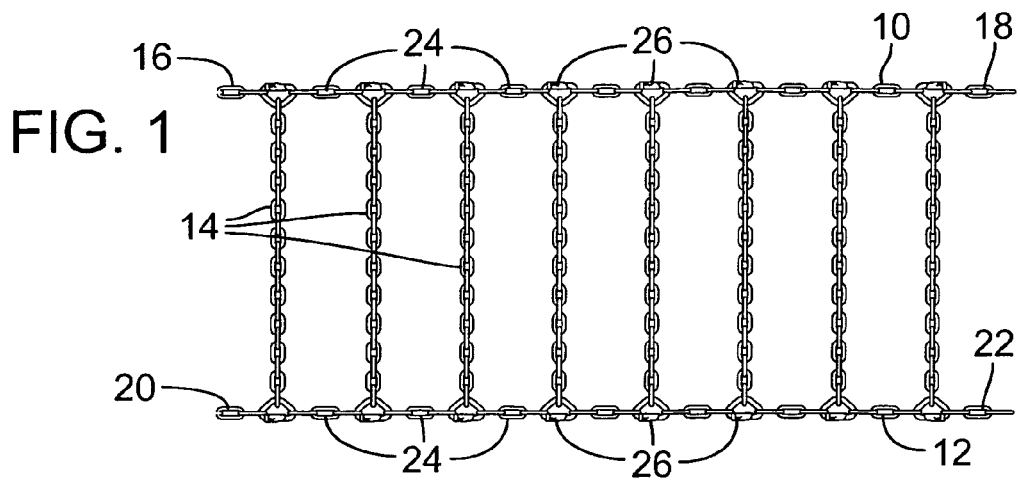
FIG. 1 is a plan view of a tire chain incorporating the concept of the present invention.

Reference is made to FIG. 1 which is a ladder type tire chain of chain links in accordance with the present invention. As is conventional for a tire chain, included is spaced apart side members 10 and 12, and multiple cross members 14 extending between the side members. As well known to the art and as mounted on a tire, one of the side members, e.g. 10, is located at the inner side wall of a tire and the other side member 12 is located at the outer side wall of a tire (as illustrated in FIG. 1 of U.S. Pat. No. 6,591,882). The opposing inner ends 16, 18 are brought together and connected together and then the opposing outer ends 20, 22 are brought together and connected together, sometimes with the aid of a chain tightener or as supplemented by the use of any of a variety of chain tighteners known to the art.

Whereas the general arrangement of side members and cross members as shown is familiar, the specific structure, as will be explained, is believed unique to the present invention. As will be noted, side members 10 and 12 are interconnected side member segments 24, each consisting of three interconnected chain links. Each segment is connected end to end to another segment by a connector 26. There are different versions of such connectors which will be explained in more detail hereafter. However, the concept of the invention is believed to be demonstrated by the structure of FIG. 1.

Each connector 26 (see also FIGS. 2A and 2B) is a rigid loop having an opening 28 into the loop as illustrated in FIG.

Figure 2A:
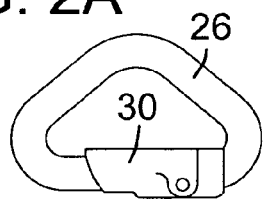
FIGS. 2A and 2B illustrate the connector utilized in the embodiment of FIG. 1.

2B. A closure member 30 is spring biased to a closed position as seen in FIG. 2A and is manually forced to the open position of FIG. 2B. As will be noted from FIG. 1, each connector 26 other than where positioned at the extreme ends, interconnects two side member segments 24 and a cross member 14.

Figure 3A:
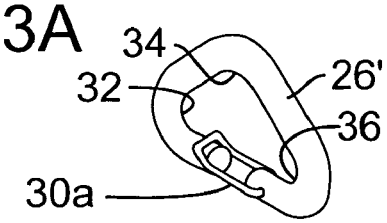
FIGS. 3A–3H illustrate the assembly of components for construction of a tire chain as illustrated in FIG. 1.
Figure 3B:
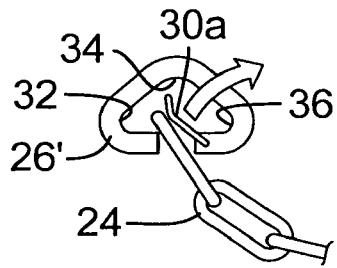
Figure 3C:
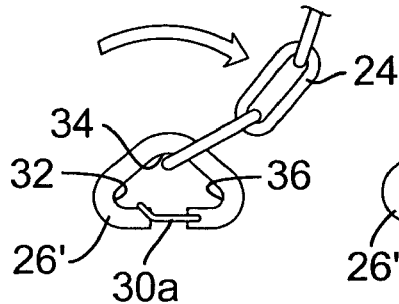
Figure 3D:
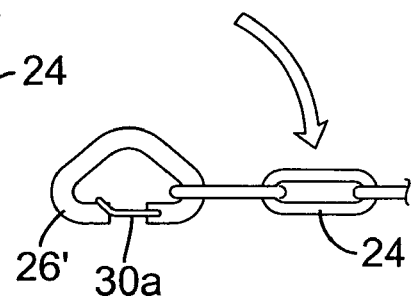
Figure 3E:
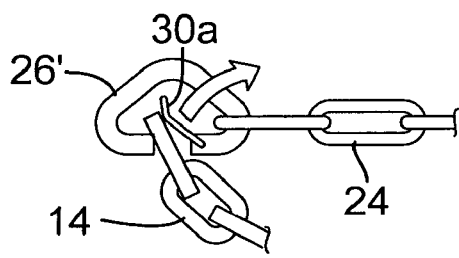
Figure 3F:
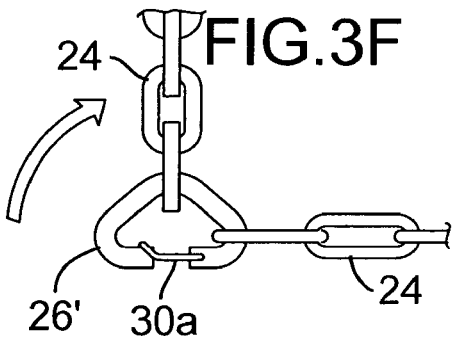
Figure 3G:
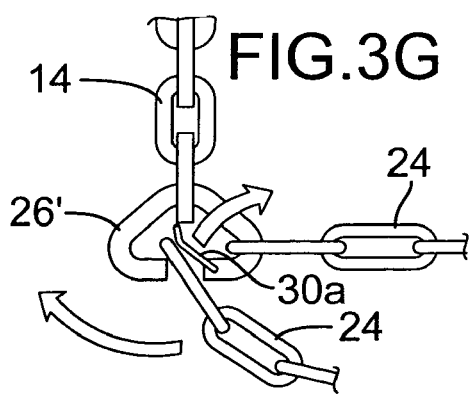
Figure 3H:
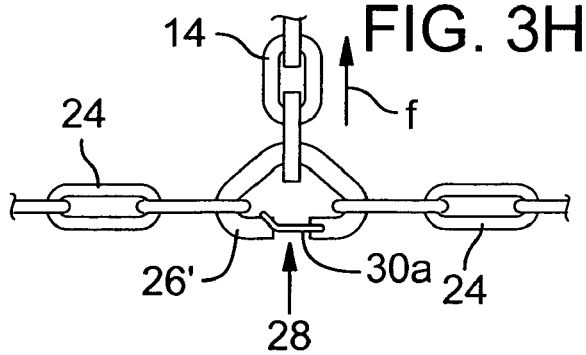

The procedure for connecting the side member segments and cross member to a connector, e.g. the connector 26', is illustrated in FIGS. 3A-3H. It will be noted that the closure member 30a of FIG. 3A-3H is somewhat modified but functions the same as closure member 30 for purposes of the following explanation. FIG. 3A shows the connector 26' as an individual component not fixedly connected to any of the other components. FIG. 3B shows an end link of a side member segment 24 forced past closure member 30a and toward a corner seat 32 whereupon the closure member 30a snaps back to the closed position and the end link is then moved from seat 32, past seat 34 as indicated in FIG. 3C and into seat 36 as seen in FIG. 3D. It is then desirable to insert an end link of a cross member 14 past closure member 30a as seen in FIG. 3E and into seat 32 whereat the closure 30a is closed to allow the end link of cross member 14 to be positioned at seat 34 as seen in FIG. 3F. Finally, the other side link segment 24 is inserted past closure member 30a and into seat 32 as illustrated in FIG. 3G and 3H.

With the side member segments 24 at corner seats 32 and 36 and cross member 14 at corner seat 34, the side member segments and cross member are optimally connected. It should be observed that the greatest tensile force operating against the connector 26 and which is indicated by arrow "f" in FIG. 3H is applied by the cross member 14 whereas the opening 28 is located between the side link segments 24 whereat relatively minor tensile force is applied. Once this arrangement of cross member and side member segments is properly assembled, that arrangement can be assured by an oversize configuration of the closure member 30a, which prevents movement across the side of opening 28 of either side member segment links 38 or 40, e.g., the width of closure member 30a is greater than the opening in the loops of links 38 and 40.

Returning now to FIG. 1, the reader will appreciate that the entire structure of the tire chain of FIG. 1 can be constructed of numerous individual side link segments 24 interconnected together and to cross members 14 via connectors 26 in the manner described above. Further, it will be appreciated that different tire sizes can be accommodated e.g. width-wise by replacing cross members 14 with shorter or longer cross members 14, and/or length-wise by replacing all or any of the three link segments 24 (at each side member) with shorter or lesser number of links or longer or greater number of links.

As indicated, the above description for FIGS. 1–3 is believed to convey the basic concept of a system for custom building tire chains e.g. by a merchant stocking a variety of tire chain components. The scope of this concept will be further appreciated from the following explanation of a number of variations thereto. However, such disclosed variations are not intended to be exhaustive of the many other variations or modifications that may be conceived by those skilled in the art.

Figure 4A:
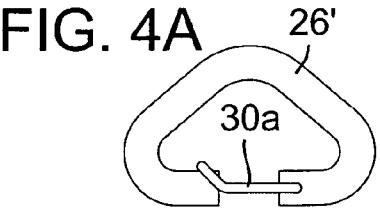
FIGS. 4A and 4B illustrate a variation of the connector of FIGS. 2A and 2B.
Figure 5A:
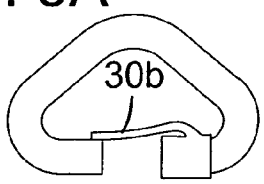
FIGS. 5A and 5B illustrate a further variation of the connectors of FIGS. 2A and 2B.
Figure 2B:
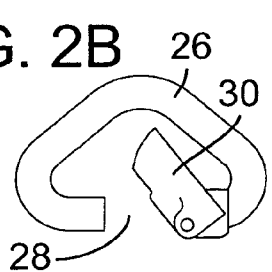
Figure 4B:
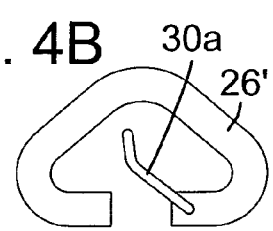
Figure 5B:
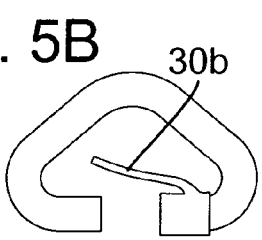
Figure 6A:
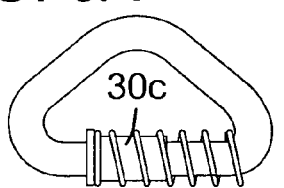
FIGS. 6A and 6B illustrate a still further variation of the connector of FIGS. 2A and 2B.
Figure 7A:
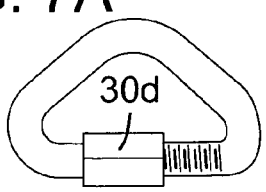
FIGS. 7A and 7B illustrate a still further variation of the connector of FIGS. 2A and 2B.
Figure 8:
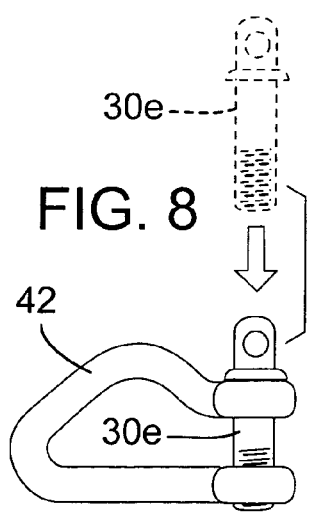
FIG. 8 illustrates a still further variation of the connector of FIGS. 2A and 2B.
Figure 6B:
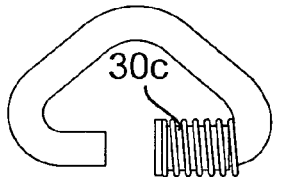
Figure 7B:
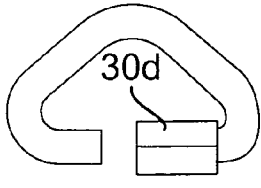

FIGS. 4A, 4B; 5A, 5B; 6A, 6B; and 7A, 7B and FIG. 8 illustrate different versions of connectors in open and closed positions as compared to that of FIGS. 2A, 2B (the same connector also illustrated in FIG. 1). FIG. 4A and 4B illustrate a connector including an offset wire spring as the closure member 30a in open and closed position (and which is also the connector of FIGS. 3A through 3H). FIGS. 5A and 5B illustrate a connector including a stamped metal spring as closure member 30b. FIGS. 6A, 6B illustrate a compression spring as closure member 30c. FIGS. 7A, 7B illustrate a bridge nut and screw threads as closure member 30d. FIG. 8 illustrates a connector wherein the opening 28, when closed, also serves as a cradle for, e.g., side link 40 (see FIG. 3H), the closure member being the screw pin 30e screwed into screw threads provided in connector end 42.

It will be readily apparent to those skilled in the art and having reference to the above description for FIGS. 1–3, how the connectors of FIGS. 4–8 are applied to the tire chain components.

As will also be apparent to those skilled in the art, the type and sizes of tire chains to which this invention is applicable is substantially unlimited. Examples only of such unlimited other types and sizes are illustrated and briefly described in the following paragraphs.

Figure 9:
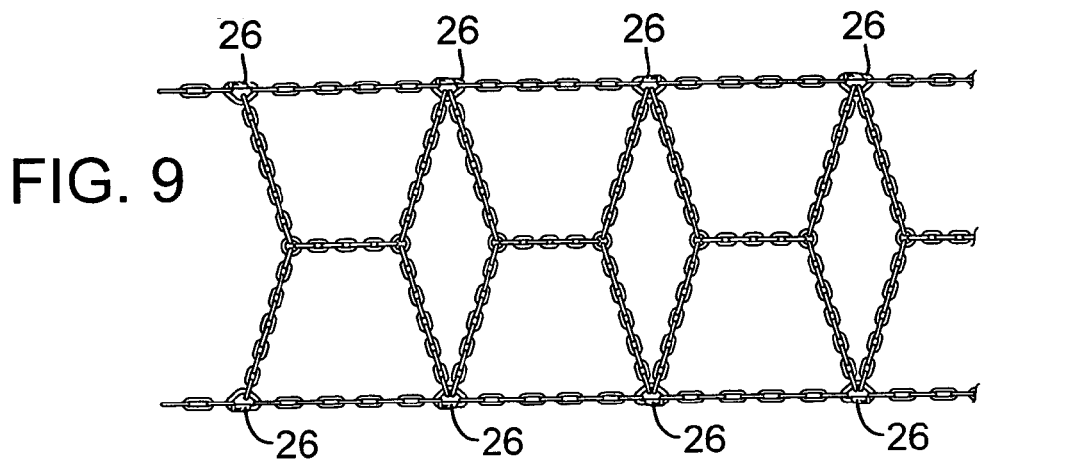
FIGS. 9 and 10 illustrate variations of tire chain types and/or styles.
Figure 10:
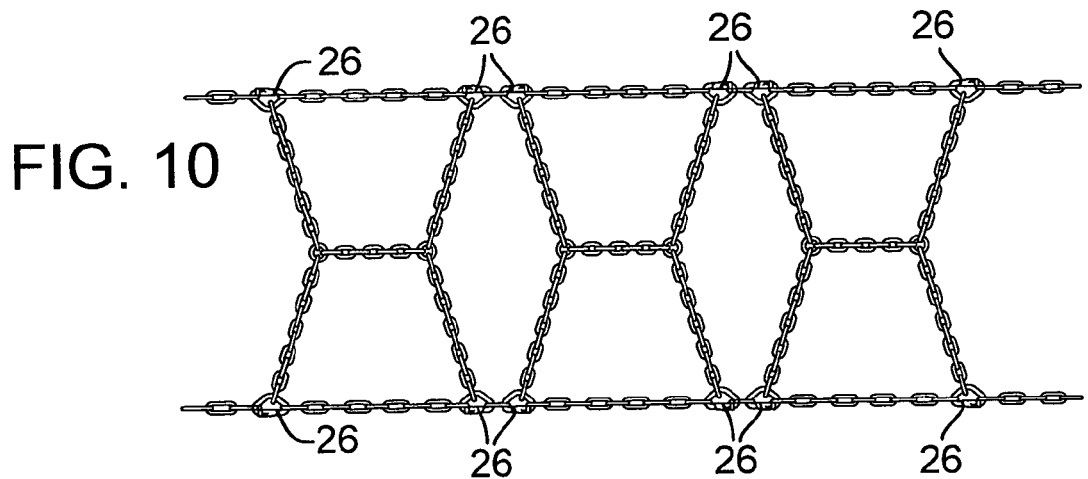

FIGS. 9 and 10 are variations of link type or style of tire chains, FIG. 9 referred to as a diamond shaped or style tire chain and FIG. 10 an H-shape or style tire chain.

Figure 11:
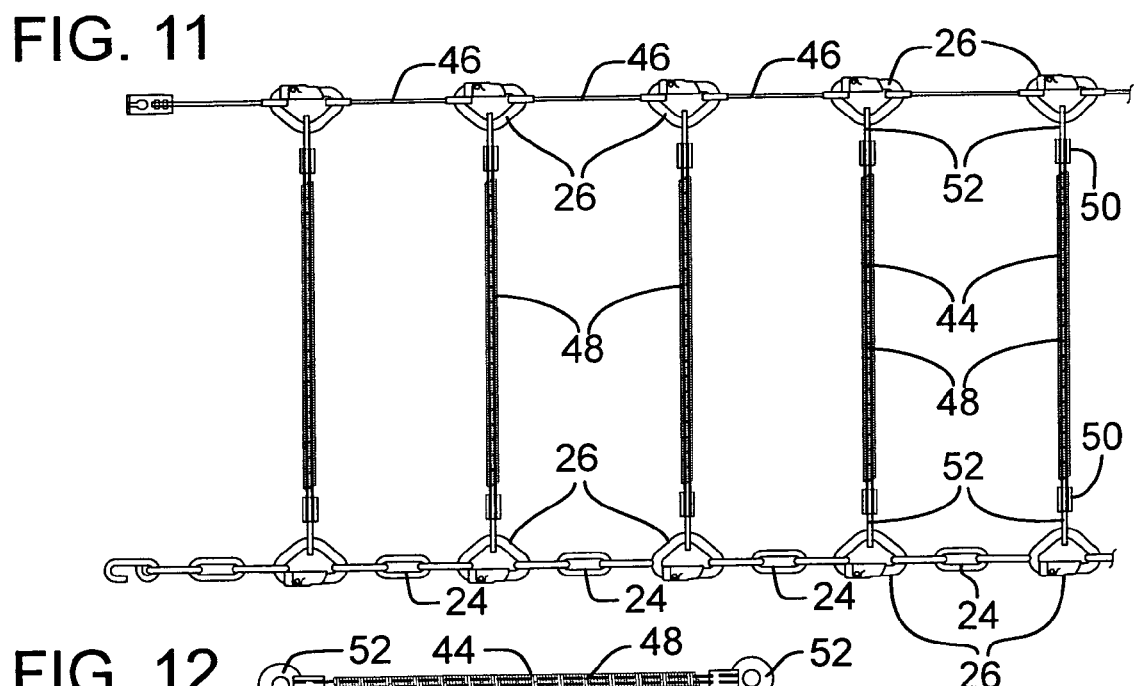
FIGS. 11 and 12 illustrate a combination of component types making up a tire chain in accordance with the invention.
Figure 12:
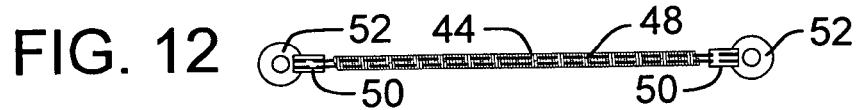

FIGS. 11 and 12 illustrate a ladder type or style tire chain but having cable instead of chain links as the inner side member segments 46 and as the core portion of cross members 44. FIG. 12 illustrates a side view of cross member 44 that extends between cable type side member segments 46 and a chain link type side member segment 24. As is common for cable cross members, the cable is provided with sleeve segments of coiled springs 48 surrounding the cable and which are retained centrally on the cross members by retainers 50, the connectors 26 being similar to that of FIGS. 1 and 2 and which function in the same manner, the connector end fitted through an opening in disk 52 provided at both ends of both side member segments 46 and cross members 44 as best viewed in FIG. 12.

FIG. 13 is similar to the structure of FIG. 11 (but see also FIG. 12) which shows an alternate type or style referred to as a V-type tire chain which provides for the connectors 26 having four tire chain components connected into the connector (two cross members 48 and two side member segments 24).

FIG. 14 illustrates the combination of three different types of components, e.g., a side cable member 46, a side link member 24, and strap type cross member 54, the latter shown in more detail in FIG. 15.

Figure 16:
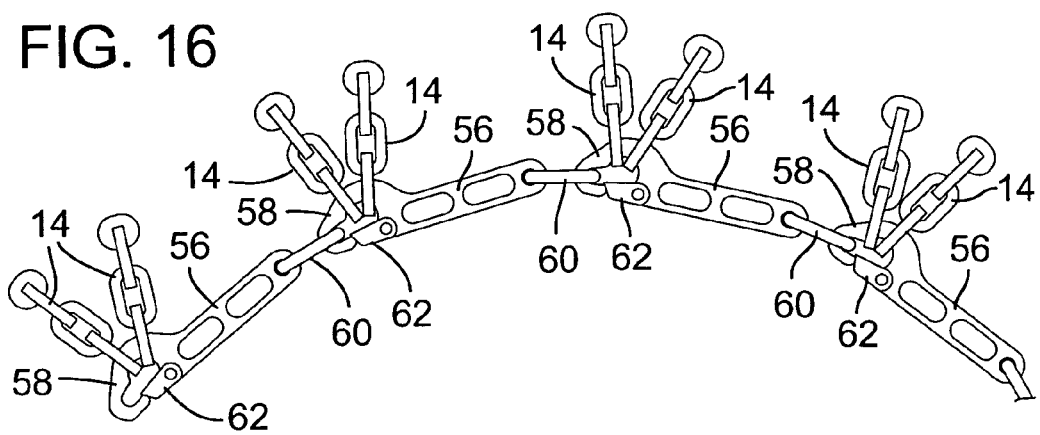
FIGS. 16–23 illustrate a further embodiment of the invention and the manner of assembly.
Figure 17:
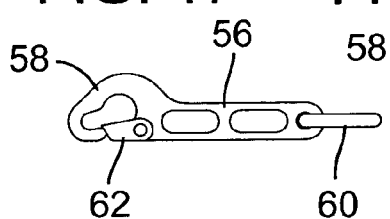

FIGS. 16–23 illustrate an embodiment that includes a bar type side member segment 56 (including connecting link 60) having a formed end 58 that functions as the connector. FIG. 16 is similar to FIG. 13 in providing interconnection of four tire chain components, i.e., a pair of cross members 14, side member segment 56, and link 60 of the preceding side member segment.

Figure 18:
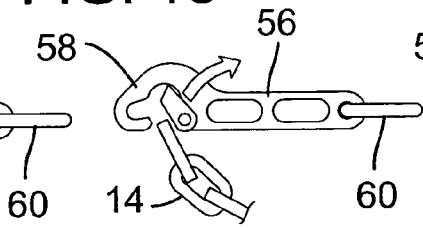
Figure 19:
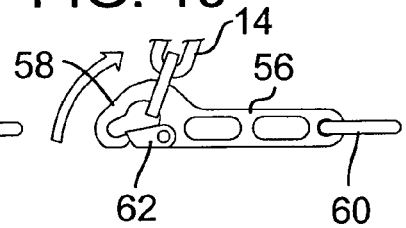
Figure 20:
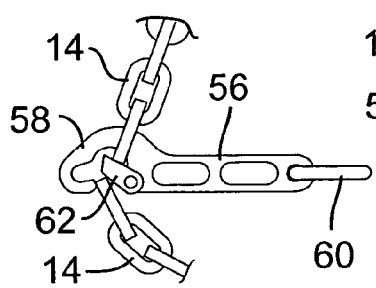
Figure 21:
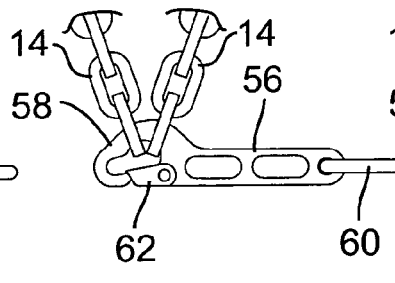
Figure 22:
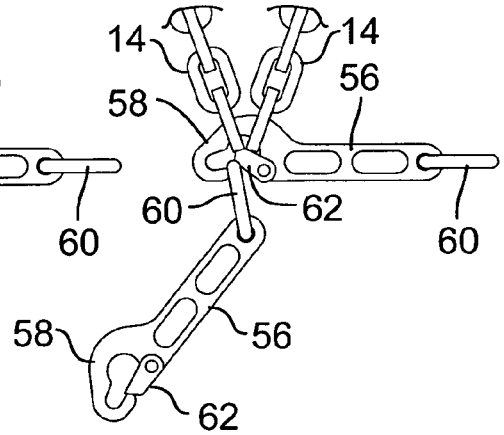
Figure 23:
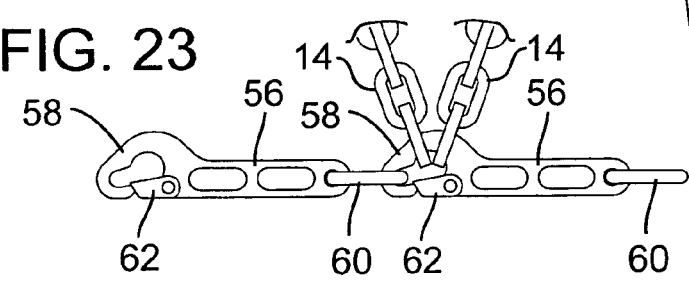

FIGS. 17–23 illustrate the procedure for interconnecting the components. FIG. 18 shows a first cross member 14 inserted past the closure member 62 of formed end 58 and moved to its operating position as seen in FIG. 19. FIGS. 20 and 21 show a second cross member 14 inserted into the formed end 58, and FIGS. 22 and 23 show the link 60 adjacent side member segment 56 inserted into the connector of formed end 58.

Figure 24:
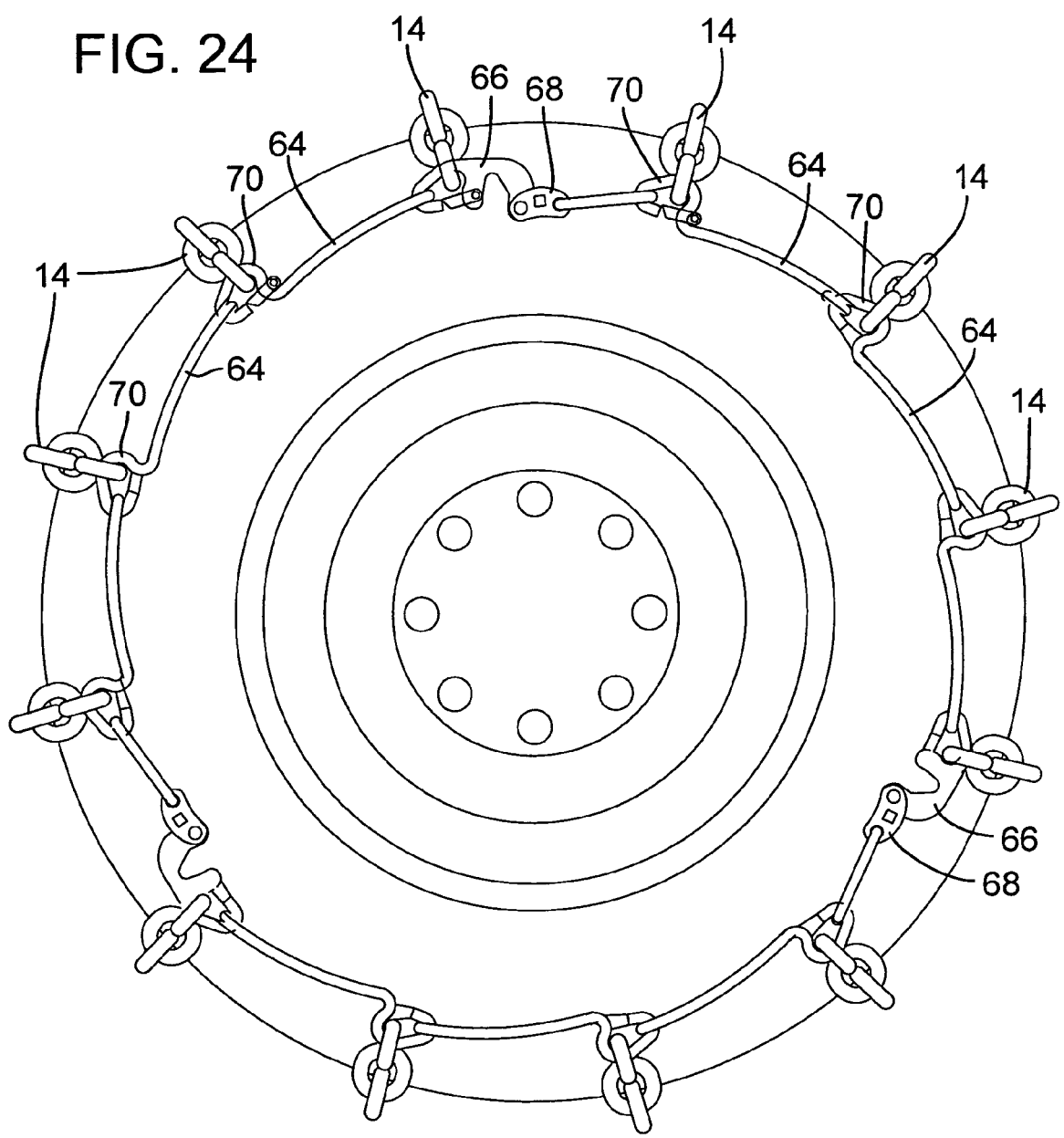

FIGS. 24–28 illustrate a further variation of a tire chain, including a one-piece side member segment 64, but including side member segments 66 modified to have a cam lock component 68. As shown in FIGS. 24 and 25, segments 64, 66 are interconnected by the connector at formed end 70 but note from FIG. 24 that prior to connection of end to end side member segments 64, 66, a cross member 14 is first seated in the formed end 70 as shown. Whereas cam lock component 68 is shown in an unlocked position in FIGS. 24 and 26, the locked position is shown in FIGS. 25 and 27. FIG. 28 shows a variation to the shape of the formed end 70 and is indicated to be 70'. Shaped end 70' shows multiple link receiving seats 72.

FIG. 29 illustrates a type of creative interconnection of the various components, e.g., a link 64 of FIG. 24, a cam lock 74 as is typical of tire chains currently in use, and a connector 26 as shown in FIGS. 4A, 4B.

FIG. 30 shows the side link member 64 of FIGS. 24, 25, having a plastic or elastomer cover 76 as may be desired to protect a tire's side wall.

FIGS. 31 through 33 illustrate a still further embodiment referred to as having two-part connectors. Part 78 is a flat plate having connector holes 80, 82. FIG. 34, as taken along view lines 34–34 of FIG. 31, shows connector 84 having closure member 86 which enables connection of connector 78 to cross member 14.

FIGS. 32 and 33, taken along view lines 32–32 of FIG. 31, show a connector part 88 having releasable connectors at both ends, one end fitted to a hole 80 of connector part 78 as permitted by closure member 90, and the opposing end permitting connection to a side member segment.

FIGS. 35A–35D illustrate a still further embodiment of the invention. As mentioned in connection with the explanation of FIG. 3H, the tensile force applied by the cross member is far greater than the force imparted by side member segments 24 (through connecting links 38 and 40). The opening 28 produces a weakness in the connector link that dictates that the opening 28 be positioned where least likely to be forced open, i.e., between the side link segments. A drawback to this design is that the side member segments cannot be connected together prior to connection of the cross member segments. The embodiment of FIGS. 35A–35D and FIGS. 36A–36G provides a fix to this drawback.

With reference to FIGS. 35A–35D, the connector 92 includes an opening 94 as closed by closure member 96. Closure member 96 is channel shaped with an opening 98 that permits formed hook portion 100 of connector 92 to enter opening 98 and become hooked onto cross bar 102 of the closure member.

It will be observed that the hooking engagement between the closure member 96 and the connector 92 (FIG. 35D) produces added resistance to a tensile force acting to pull the connector open.

FIGS. 36A–36G illustrate the benefit of this latching type arrangement. As seen in FIGS. 36A–36D, this modified version allows the connecting links 92 to be connected to a sequence of side links 104 to create a side member. In this assembled form, and as depicted in FIG. 36G, cross members 14 can be connected to the connector 92 as a subsequent operation. Such enables preassembly of the side members (FIG. 36F) and then assembly, as desired, of cross members 14 (FIG. 36G). Further, should it be desirable to replace a cross member, it is not necessary to separate two side member segments as is the case for the version of FIGS. 3A–3H. With reference now to FIG. 37, illustrated is a connector 92' wherein a side link 104 is fixedly secured to the connector 92'.

It will be appreciated that the connectors, the cross members and the side member segments can take many different forms and can be intermixed as may be desired. Accordingly, the invention is not intended to be limited to any particular combination or arrangement as herein described, but instead is intended to encompass a system for interfitting many different types of components in accordance with the definition of the claims appended hereto.

What is claimed is:

1. A tire traction structure of modular construction comprising:
    a first side member, a second side member and a plurality of cross members extending between said side members at spaced apart locations along said side members;
    said first and second side members each consisting of side members segments that generally define the distance between said spaced apart locations, and a manually operable connector at each location interconnecting the side member segments and cross members at said spaced locations thereby enabling manual customized assembly of a desired tire chain size at a point of purchase; and wherein the connector includes at least three cradle positions with a closable opening between two of said cradle positions, said cross member and side member segments having ends, said cross member end of the tire chain residing in one cradle position with the other two cradle positions receiving the side member ends, and the connector opening positioned between the side member ends.

2. A tire traction structure of modular construction comprising:
    a first side member, a second side member and a plurality of elongate traction-generating cross members extending between and coupled to said side members at spaced apart locations along said side members;
    said first and second side members each consisting of side member segments that generally define the distance between said spaced apart locations, and a manually openable closed loon connector providing a releasable connection substantially at each location for interconnecting adjacent side member segments and a cross members generally at said spaced apart locations and thereby enabling selective manual replacement of individual segments and cross members and/or complete customized assembly of a desired tire chain size from said side member segments and cross members.

3. The tire traction chain structure of claim 2, wherein said cross members each have a first end link and a second end link, and wherein said interconnection of the side member segments and cross members includes having an end portion of a first side member segment passed through said first end link of the a cross member and said connector then interconnecting said end portion of said first side member segment with an end portion of a second side member segment.

4. A method for customized assembly of modular tire traction structures having opposing side members, comprising:
    gathering a collection of components including numerous ones of elongate traction-generating cross members, side member segments and manually operable closed loon connectors for interconnecting said segments and cross members; selecting a tire chain size, determining a desired spacing between cross members and further determining the length of a tire chain to be assembled for the selected tire chain size;
    selecting a number of side member segments for each side member to accommodate the desired spacing between the cross members, and including the number of segments and cross members to generate the desired length of the tire chain structure to be assembled; and
    connecting the segments to each other, end to end, and to respective cross members using the manually operable closed loop connectors to thereby assemble said modular tire chain structure.

\* \* \* \* \*

UNITED STATES PATENT AND TRADEMARK OFFICE
CERTIFICATE OF CORRECTION

PATENT NO. : 7,204,282 B2  Page 1 of 1
APPLICATION NO. : 10/703841
DATED : April 17, 2007
INVENTOR(S) : Gary Scott et al.

It is certified that error appears in the above-identified patent and that said Letters Patent is hereby corrected as shown below:

Column 6
Lines 7-8, "...side members segments..." should read --...side member segments...--.

Column 6
Line 12, "...spaced locations..." should read --...spaced apart locations...--.

Column 6
Line 30, "...closed loon..." should read --...closed loop...--.

Column 6
Lines 32-33, "...a cross members..." should read --...cross members...--.

Column 6
Line 38, "...traction chain structure..." should read --...traction structure...--.

Column 6
Line 43, "...of the a cross..." should read --...of the cross...--.

Column 6
Lines 52-53, "...closed loon..." should read --...closed loop...--.

Signed and Sealed this

Seventeenth Day of March, 2009

JOHN DOLL
*Acting Director of the United States Patent and Trademark Office*